(12) United States Patent
Sargent et al.

(10) Patent No.: US 11,964,174 B2
(45) Date of Patent: Apr. 23, 2024

(54) CIRCULAR MOUNTING DEVICE

(71) Applicant: Rooftop Anchor, Inc., Heber City, UT (US)

(72) Inventors: Nathan Colton Sargent, Heber City, UT (US); Rowdy Hans DeJong, Heber City, UT (US); Braxton Tyler Schindler, Heber City, UT (US); Kynan Dee Wynne, Heber City, UT (US); John David Whittington, Heber City, UT (US); Reese James Ferrin, Wanship, UT (US); Joshua Paul Adam, Heber City, UT (US)

(73) Assignee: Rooftop Anchor, Inc., Heber City, UT (US)

( * ) Notice: Subject to any disclaimer, the term of this patent is extended or adjusted under 35 U.S.C. 154(b) by 25 days.

(21) Appl. No.: 17/473,926

(22) Filed: Sep. 13, 2021

(65) Prior Publication Data

US 2022/0228388 A1    Jul. 21, 2022

Related U.S. Application Data

(60) Provisional application No. 63/139,953, filed on Jan. 21, 2021.

(51) Int. Cl.
*A62B 35/00* (2006.01)
*E04G 21/32* (2006.01)
*F16M 13/02* (2006.01)

(52) U.S. Cl.
CPC ...... *A62B 35/0068* (2013.01); *E04G 21/3214* (2013.01); *E04G 21/3219* (2013.01); *E04G 21/3276* (2013.01); *F16M 13/02* (2013.01)

(58) Field of Classification Search
CPC .. E04G 21/3276; A62B 35/0068; F16M 13/02
See application file for complete search history.

(56) References Cited

U.S. PATENT DOCUMENTS 3,618,444 A  *  11/1971  Kay et al. ............... F16B 37/14
                                                 411/373
4,316,690 A  *   2/1982  Voller .................... F16B 33/004
                                                 411/377
(Continued)

FOREIGN PATENT DOCUMENTS

DE    102011078114 A1  *  4/2012  ......... A62B 35/0068
EP         2216466 A1  *  8/2010  ............... A62B 1/04
(Continued)

*Primary Examiner* — Eret C McNichols
(74) *Attorney, Agent, or Firm* — Renner, Otto, Boisselle & Sklar, LLP

(57) ABSTRACT

A mounting device may include a top plate including a cone-shaped center portion, a flange coupled to the cone-shaped center portion, a number of apertures defined in the flange, and a number of fasteners engaged with the apertures to couple the top plate to a surface of a structure. The flange seals a bottom side of the top plate to the surface of the structure. The flange includes a seal coupled to the bottom of the flange. The cone-shaped center portion has a convex paraboloid shape. The flange includes at least one surface that is parallel to a surface of the structure, and a transition between the cone-shaped center portion and the flange forms an angle. The top plate has a diameter sufficient to displace a load greater than 50 pounds over the surface of the structure.

22 Claims, 8 Drawing Sheets

(56) References Cited

U.S. PATENT DOCUMENTS

| | | | | |
|---|---|---|---|---|
| 4,467,581 | A * | 8/1984 | Francovitch | E04D 5/143 |
| | | | | 52/410 |
| 4,480,819 | A * | 11/1984 | Lopez | E04G 21/3233 |
| | | | | 182/113 |
| 4,923,348 | A * | 5/1990 | Carlozzo | F16B 37/14 |
| | | | | 52/515 |
| 5,320,193 | A * | 6/1994 | Bongiovanni | E04G 21/3276 |
| | | | | 248/237 |
| 5,346,036 | A * | 9/1994 | Arisman | E04G 5/041 |
| | | | | 248/200.1 |
| 5,711,397 | A * | 1/1998 | Flora | E04G 21/3242 |
| | | | | 248/228.3 |
| 6,227,329 | B1 * | 5/2001 | Ador | A62B 35/0056 |
| | | | | 182/36 |
| 7,163,083 | B2 * | 1/2007 | Argoud | E04G 21/3261 |
| | | | | 248/237 |
| 7,207,414 | B2 * | 4/2007 | Luke | A62B 35/04 |
| | | | | 182/45 |
| 7,240,770 | B2 * | 7/2007 | Mullins | E04G 21/3276 |
| | | | | 52/24 |
| 7,654,501 | B2 * | 2/2010 | Matthews | E04H 6/426 |
| | | | | 116/28 R |
| 7,914,057 | B2 * | 3/2011 | Rohlf | A62B 35/0068 |
| | | | | 294/64.2 |
| D658,975 | S * | 5/2012 | Cordova | E04D 5/143 |
| | | | | D8/367 |
| 8,210,785 | B1 * | 7/2012 | Gager | E03D 11/16 |
| | | | | 411/338 |
| 8,733,718 | B2 * | 5/2014 | Corsi | E04B 1/40 |
| | | | | 52/27 |
| 9,200,467 | B2 * | 12/2015 | Williams | E01F 9/692 |
| 9,562,555 | B1 * | 2/2017 | Talbot | F16B 5/0056 |
| 9,643,035 | B2 * | 5/2017 | Mastenbroek | A62B 35/0056 |
| 9,878,187 | B2 * | 1/2018 | Sargent | E04G 21/328 |
| 10,053,878 | B2 * | 8/2018 | Allen | A62B 35/0068 |
| 10,898,741 | B2 * | 1/2021 | Giroux | A62B 35/0068 |
| 11,078,676 | B2 * | 8/2021 | Saygivar | A62B 35/0068 |
| 11,083,917 | B2 * | 8/2021 | Saygivar | E04G 21/3204 |
| 11,118,363 | B1 * | 9/2021 | Allen | E04G 21/3219 |
| 11,306,490 | B1 * | 4/2022 | Blow | E04G 3/265 |
| 2003/0182893 | A1 * | 10/2003 | Poldmaa | E04G 5/041 |
| | | | | 52/749.12 |
| 2006/0219478 | A1 * | 10/2006 | Severs | E04G 21/3276 |
| | | | | 182/2.9 |
| 2007/0144830 | A1 * | 6/2007 | Mastenbroek | A62B 35/0068 |
| | | | | 182/3 |
| 2010/0243837 | A1 * | 9/2010 | Cox | E04G 21/329 |
| | | | | 248/237 |
| 2012/0114447 | A1 * | 5/2012 | Henriksen, Jr. | F16B 37/14 |
| | | | | 411/366.1 |
| 2015/0107184 | A1 * | 4/2015 | Nichols, Jr. | E04G 21/3276 |
| | | | | 52/698 |
| 2016/0059054 | A1 * | 3/2016 | Csizmadia | E04G 21/328 |
| | | | | 248/548 |
| 2017/0157438 | A1 * | 6/2017 | Sargent | E04G 21/328 |
| 2018/0016801 | A1 * | 1/2018 | Davis | E04H 17/00 |
| 2022/0112734 | A1 * | 4/2022 | Meinhold | E04G 21/3276 |
| 2022/0228386 | A1 | 7/2022 | Sargent et al. | |
| 2022/0228387 | A1 * | 7/2022 | Sargent | A62B 35/0068 |
| 2022/0228704 | A1 * | 7/2022 | Sargent | A62B 35/0068 |

FOREIGN PATENT DOCUMENTS

| | | | | | |
|---|---|---|---|---|---|
| EP | 2615225 | A2 * | 7/2013 | | A62B 35/0056 |
| EP | 2687267 | A1 * | 1/2014 | | A62B 35/0068 |
| GB | 2396195 | A * | 6/2004 | | F16F 1/042 |
| GB | 2466054 | A * | 6/2010 | | A62B 35/04 |
| GB | 2520168 | A * | 5/2015 | | A62B 35/0068 |
| GB | 2567500 | A * | 4/2019 | | A62B 35/0043 |
| WO | WO-2009142480 | A1 * | 11/2009 | | A61B 1/04 |

* cited by examiner

CIRCULAR MOUNTING DEVICE

RELATED APPLICATIONS

The present application claims benefit under 35 U.S.C. § 119(e) of U.S. Provisional Application No. 63/139,953, filed Jan. 21, 2021. This application is herein incorporated by reference in its entirety.

TECHNICAL FIELD

The present disclosure relates generally to rooftop anchoring devices. Specifically, the present disclosure relates to systems and methods for surface coupling devices incorporating a format to distribute a load across a surface and a number of sealing devices to seal any apertures defined in the surface created by fasteners used to fasten the rooftop anchoring devices to the surface.

BACKGROUND

People working on the tops and sides of buildings, as well as other high structures, risk falling and suffering injury as a result. In modern society, building construction and building maintenance are areas that continue to expose workers to the risk of dangerous falls. According to the U.S. Department of Labor, work related falls are among the most common sources of work related severe injuries and death. (See, e.g., https://www.osha.gov/SLTC/fallprotection/). The Department of Labor's Bureau of Labor Statistics reports that slips, trips and falls resulted in approximately 229,000 injuries per year (2011-2013) resulting in approximately 700 workplace deaths per year. Death from falls is second only to vehicle related deaths and account for roughly 16% of work related deaths. Occupational Safety and Health Administration (OSHA) and American National Standards Institute (ANSI) I-14 provide standards to reduce the number and severity of workplace falls. Fall protection equipment must, perform under a wide variety of conditions while not hindering the ability of the workers to safely perform their jobs.

In addition, workers who are tasked with working on a roof of a building or even suspending from the roof of a building require certified tie-off points to connect their rigging. These points are regulated by OSHA in the 1910.27 standard and other regulations and are required to support a minimum 5,000 lbs. load. These tie-off points, which may be referred to as "anchorage points" in the industry, must be designed, built, and installed under the direction of a qualified person or a professional engineer. These anchorage points are often used interchangeably for suspension rigging and as a connection for fall protection equipment.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION

Figure 1:
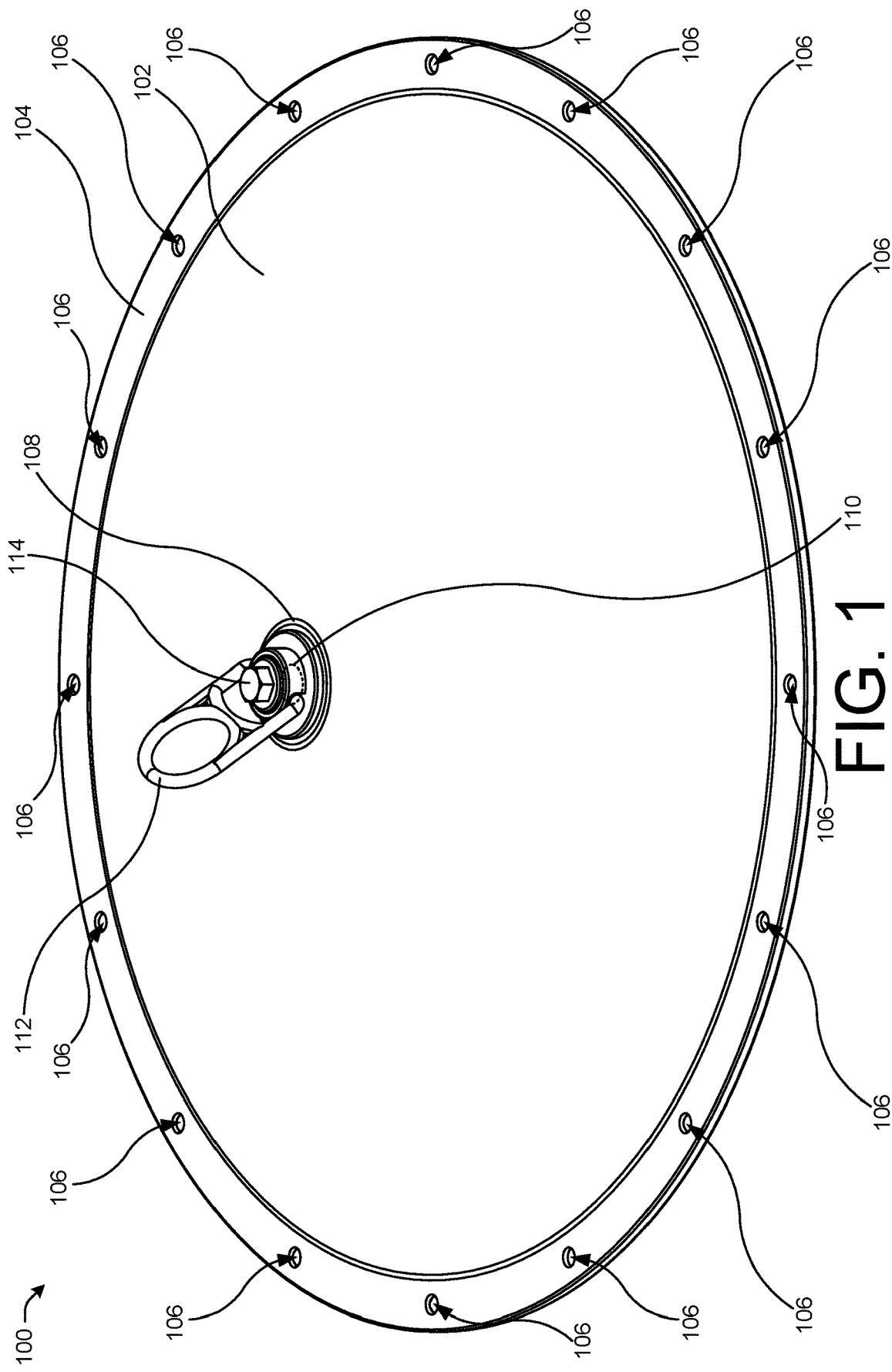
FIG. 1 illustrates a top isometric view of a mounting device, according to an example of the principles described herein.

Fall protection devices are devices that assist in protecting users from falling off structures such as buildings. These fall protection devices seek to prevent a fall from structures by securing the user to anchors coupled to the structure such as the roof. These devices are often required and regulated by OSHA that function under a number of laws and regulations such as Title 29 of the Code of Federal Regulations. Further, industries standards may be provided by private, non-profit organizations such as the ANSI. For example, guidance and testing parameters for fall protection and fall arrest devices are provided by the ANSI Z-359 Fall Protection Code.

OSHA is concerned with the safety, health, and welfare of people engaged in work or employment. The goals of occupational health and safety programs include fostering a safe and healthy work environment. OSHA may also protect co-workers, family members, employers, customers, and many others who might be affected by the workplace environment. Thus, OSHA seeks to protect any individual who may use devices such as a stanchion that provides a secure tie down while accessing a rooftop area, for example. Due to the distances that may separate the roof of a structure from a ground floor or other elevation below the roof, an individual accessing the roof area may be in significant danger as to loss of life or limb if a fall should occur. Thus, a fall protection system that secures an individual while accessing the roof of the structure significantly reduces or eliminates any death or injuries that may otherwise be experienced during such activities.

Examples described herein provide a system including a mounting device onto which a user may secure themselves from a fall. The mounting device includes a circular shape or form that provides additional stability across a wide area of a rooftop. Further, the circular-shaped mounting device may be coupled to a surface such as a roof surface in a plurality of points along the surface of the roof resulting in the mounting device being coupled more securely to the roof surface. Still further, the circular-shaped mounting device may be coupled to any portion of a roof structure irrespective of the location of trusses or joists into which the mounting device may be coupled. Thus, the mounting device may be coupled to either underlying anchoring structures such as, for example, the trusses or joists, or may be coupled to the deck of a surface (e.g., the roof surface) without anchoring into the underlying anchoring structures.

In one example, the circular-shaped mounting device may include sealable or self-sealing membranes that cover fasteners and holes formed in the surface of the roof. The fasteners used to couple the mounting device to the roof surface may be coupled to any portion of the roof surface irrespective of whether the fasteners couple to underlying structures within the roof such as any truss or joist. Thus, in this manner, the circular-shaped mounting device may be coupled at any position along the roof surface while still providing a necessary load rating that may secure a user to the roof. In one example, the load rating of the mounting device may be approximately 5,000 pounds.

Examples described herein provide a mounting device. The mounting device may include a top plate including a cone-shaped center portion, a flange coupled to the cone-shaped center portion, a number of apertures defined in the flange, and a number of fasteners engaged with the apertures to couple the top plate to a surface of a structure. The flange seals a bottom side of the top plate to the surface of the structure. The flange includes a seal coupled to the bottom of the flange. The cone-shaped center portion has a convex paraboloid shape. The flange includes at least one surface that is parallel to a surface of the structure, and a transition between the cone-shaped center portion and the flange forms an angle. The top plate has a diameter sufficient to displace a load greater than 50 pounds over the surface of the structure.

The mounting device further includes a bolt extending through a first aperture defined in the top plate. The mounting device further includes a tether coupled to the bolt. The cone-shaped center portion has a convex paraboloid shape, and the bolt is located at a vertex of the convex paraboloid shape. The fasteners are sealed from an environment.

Examples described herein also provide an apparatus including a top plate. The top plate includes a cone-shaped center portion, a flange coupled to the cone-shaped center portion, a number of apertures defined in the flange, and a number of fasteners engaged with the apertures to couple the top plate to a surface of a structure.

The flange seals a bottom side of the top plate to the surface of the structure. The flange includes a seal coupled to a bottom of the flange. The cone-shaped center portion has a convex paraboloid shape. The flange includes at least one surface that is parallel to the surface of the structure, and a transition between the cone-shaped center portion and the flange forms an angle. The top plate has a diameter sufficient to displace a load greater than 50 pounds over the surface of the structure.

The apparatus further includes a bolt extending through a first aperture defined in the top plate. The apparatus further includes a tether coupled to the bolt. The cone-shaped center portion has a convex paraboloid shape, and the bolt is located at a vertex of the convex paraboloid shape. The fasteners are sealed from an environment.

In the description herein, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

EXAMPLE EMBODIMENTS

Figure 2:
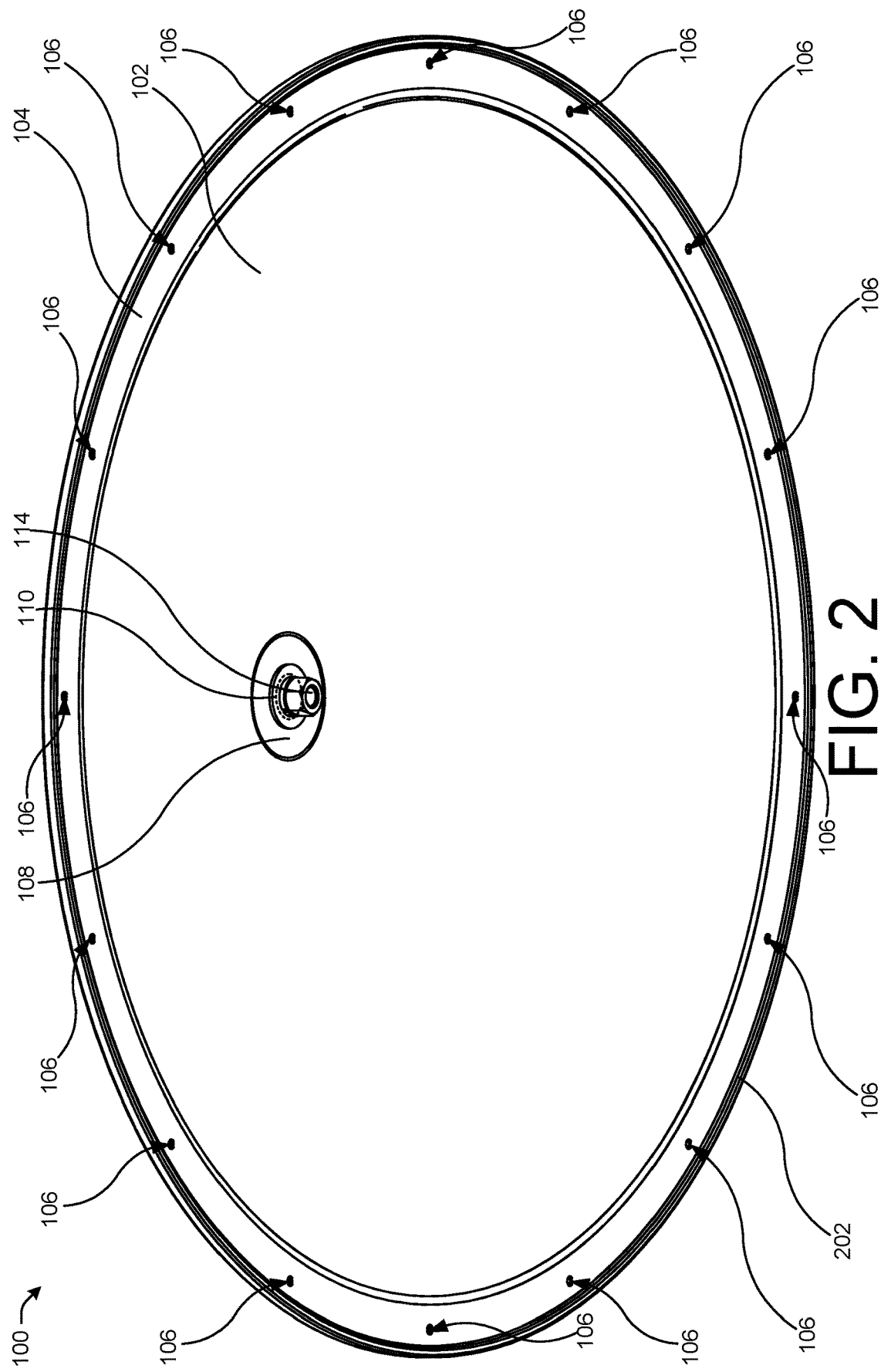
FIG. 2 illustrates a bottom isometric view of the mounting device of FIG. 1, according to an example of the principles described herein.
Figure 3:
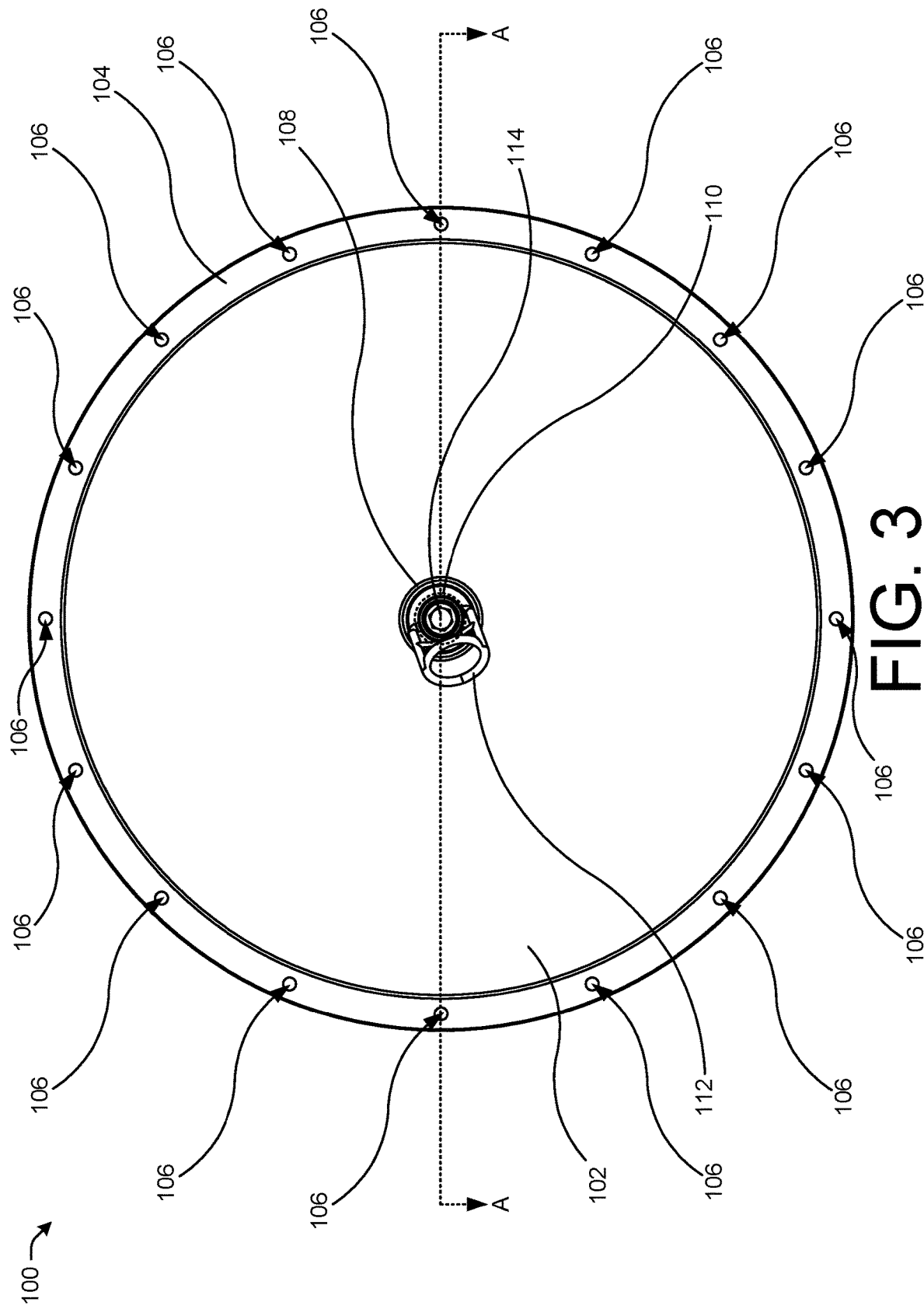
FIG. 3 illustrates a top plan view of the mounting device of FIG. 1, according to an example of the principles described herein.
Figure 4:
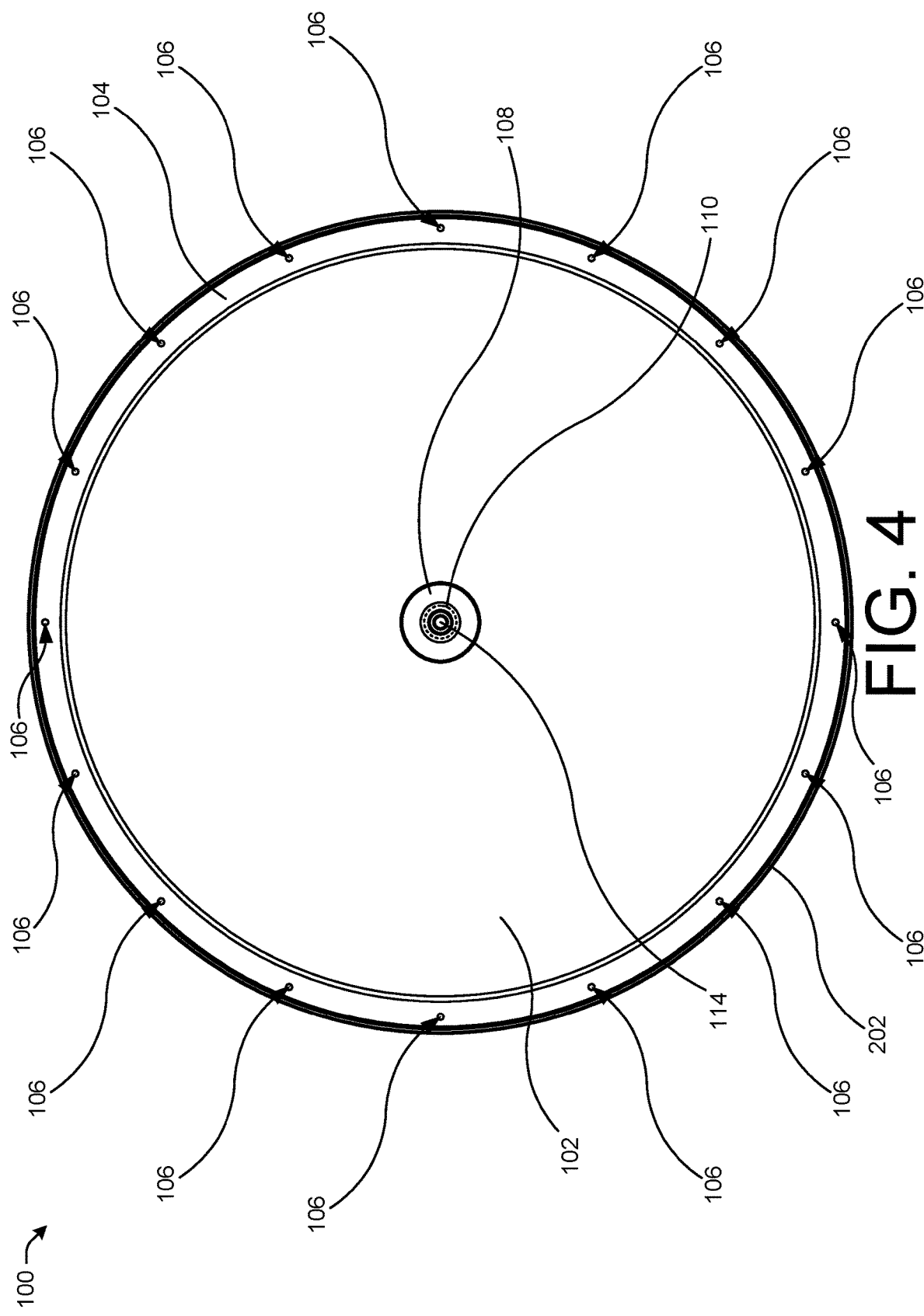
FIG. 4 illustrates a bottom plan view of the mounting device of FIG. 1, according to an example of the principles described herein.
Figure 5:
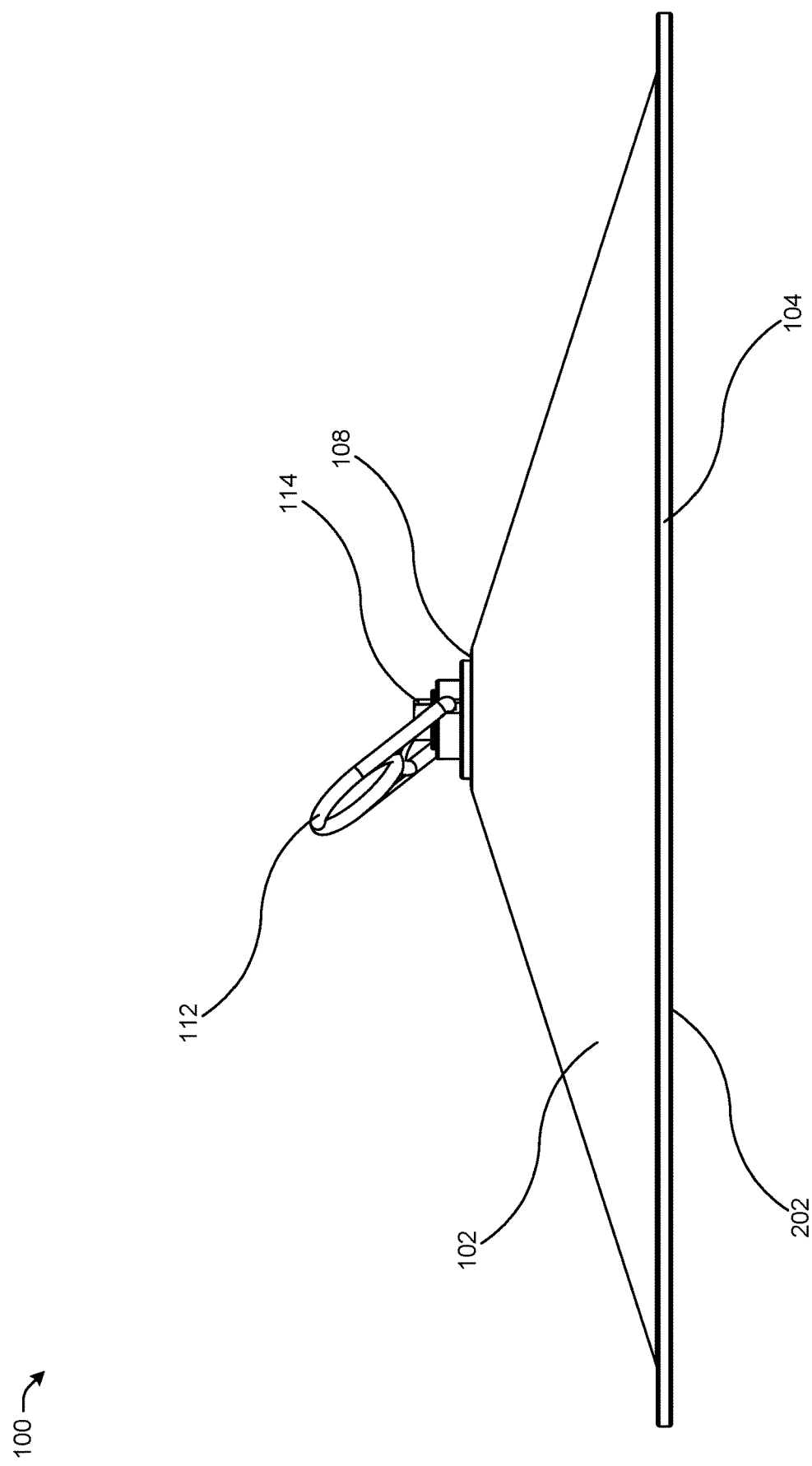
FIG. 5 illustrates a side plan view of the mounting device of FIG. 1, according to an example of the principles described herein.
Figure 6:
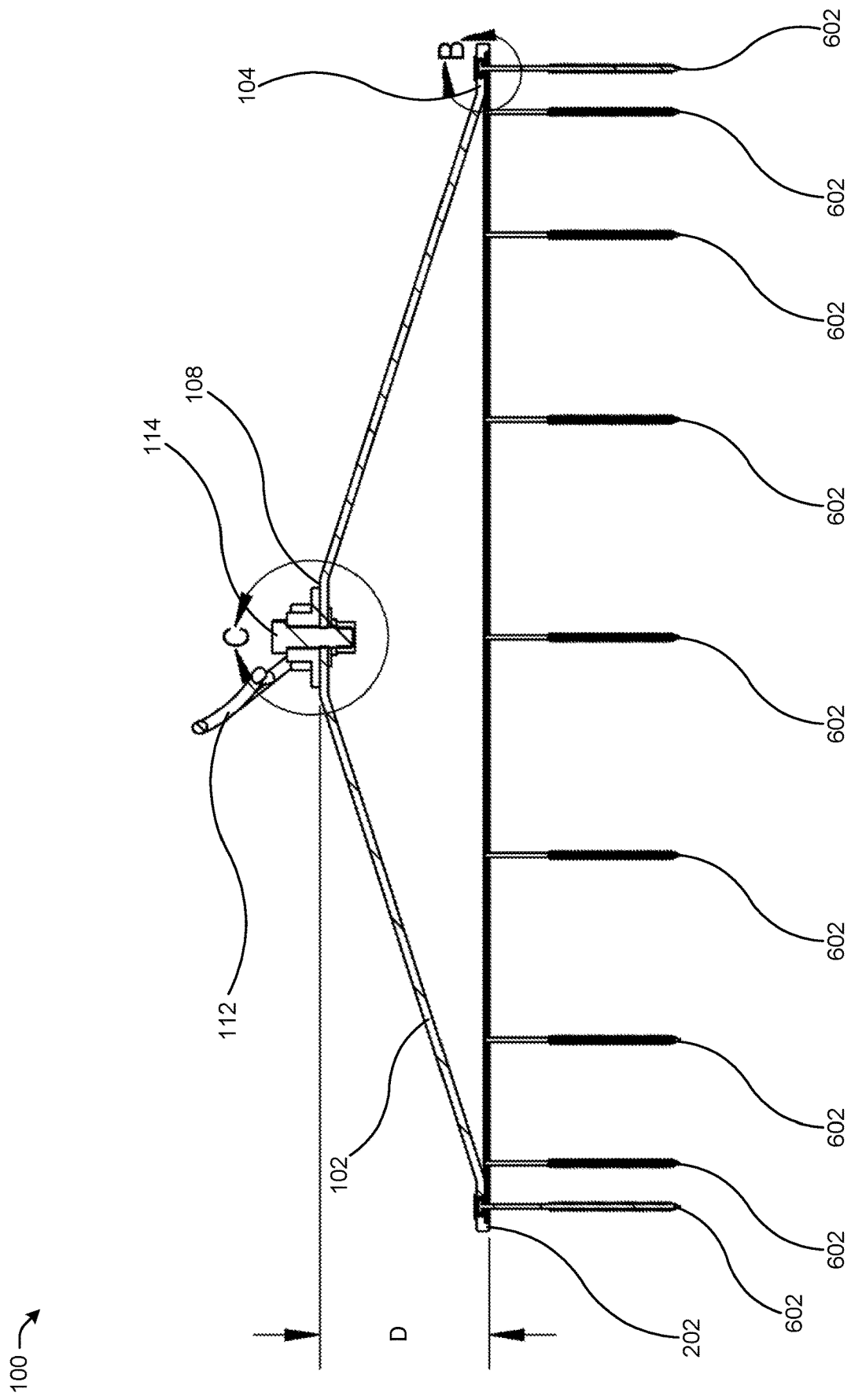
FIG. 6 illustrates a side cross-sectional view of the mounting device of FIG. 1 along line A depicted in FIG. 3, according to an example of the principles described herein.

Turning now to the figures, FIGS. 1 through 8 depict and describe a mounting device 100 and portions thereof. Throughout the description, the terms "mounting device" and "circular-shaped mounting device" are used synonymously to refer to element 100. FIG. 1 illustrates a top isometric view of a mounting device 100, according to an example of the principles described herein. FIG. 2 illustrates a bottom isometric view of the mounting device 100 of FIG. 1, according to an example of the principles described herein. FIG. 3 illustrates a top plan view of the mounting device 100 of FIG. 1, according to an example of the principles described herein. FIG. 4 illustrates a bottom plan view of the mounting device 100 of FIG. 1, according to an example of the principles described herein. FIG. 5 illustrates a side plan view of the mounting device 100 of FIG. 1, according to an example of the principles described herein. FIG. 6 illustrates a side cross-sectional view of the mounting device 100 of FIG. 1 along line A depicted in FIG. 3, according to an example of the principles described herein.

The mounting device 100 includes a top plate 102. The top plate 102 serves as a rigid body to which a user may be tethered. An annular flange 104 or rim may be coupled to or monolithically formed with the top plate 102. In one example, the top plate 102 may be shaped like a cone with the surface of the top plate 102 being at an angle with respect to an annular flange 104 and a surface to which the mounting device 100 is coupled. In other words, the annular flange 104 may be formed to be parallel with respect to the surface to which the mounting device 100 is coupled, and the top plate 102 may be formed at an angle relative thereto. The conical shape of the top plate 102 creates a convex shape within the mounting device 100. Stated another way, the conical shape of the top plate 102 creates convex paraboloid shape when viewed from an underside of the top plate 102. This convex shape allows for precipitation (e.g., rain, snow, etc.) to shed off of the mounting device 100 and away from the mounting device 100.

A number of flange apertures 106 may be defined in the annular flange 104. Although sixteen flange apertures 106 are depicted in FIGS. 1 through 4, any number of flange apertures 106 may be defined in the annular flange 104. A number of flange fasteners (e.g., 602, FIG. 6) may be used inserted through the flange apertures 106 and coupled to the structure in order to couple the mounting device 100 to the structure. More details regarding the flange apertures 106 and the fasteners are described herein.

The top plate 102 may include a frustrum surface 108. The frustrum surface 108 may be coupled to or monolithically formed with the top plate 102. In this manner, the frustrum surface 108 creates a conical frustrum shape of the top plate 102. A frustrum aperture 110 may be defined in the frustrum surface 108. The frustrum aperture 110 allows for an anchor 112 to be coupled to an apex of the top plate 102 at the frustrum surface 108. The anchor 112 may be coupled to the frustrum surface 108 via an anchor fastener 114 extending through the anchor 112 and the frustrum aperture 110. More details regarding the frustrum surface, 108, the frustrum aperture 110, the anchor 112, and the anchor fastener are described herein.

The anchor 112 may be coupled to the top plate 102 at, for example, a center portion of the top plate 102 such as in a direct center of the top plate 102 where the frustrum surface 108 is located. However, in one example, the shape of the top plate 102 may be such that the frustrum surface 108 and anchor 112 are located at a position within the top plate 102 off center. In this example, the top plate 102 may be of the shape of a non-right conical shape. The anchor 112 may be any device capable of providing an anchor to which ropes, cables and other fall protection equipment may be coupled. In one example, the anchor 112 may include a MEGA swivel anchor developed and distributed by ClimbTech. However, any device including a loop capable of providing an anchor to which ropes, cables and other fall protection equipment may be coupled may be utilized. The anchor fastener 114 may include, for example, a bolt, a nut, a washer, and/or a lock washer. However, any type of fastener may be used as the anchor fastener 114 including, for example, screws, nails, rivets, lynch pins, cotter pins, locking pins, clevis pins, other fasteners, and combinations thereof. Further, in one example, the anchor fastener 114 may be coupled to the top plate 102 via, for example, welding, gluing, and other methods of coupling.

Turning now, specifically, to FIG. 6, a number of flange fasteners 602 are depicted as being engaged with the flange apertures 106 defined in the annular flange 104. Further, as can bee seen by the cross-sectional view of the top plate 102 in FIG. 6, the frustrum surface 108 and the annular flange 104 are oriented in a parallel manner with respect to one another such that both the frustrum surface 108 and the annular flange 104 are oriented horizontally. Further, the top plate 102 positioned between the frustrum surface 108 and the annular flange 104 is angled with respect to the frustrum surface 108 and the annular flange 104. Thus, a transition created between the top plate 102 and the annular flange 104 forms an angle. In one example, the distance D between the frustrum surface 108 and the annular flange 104 may be between 2 and 10 inches, and, in one example, between 5 and 6 inches such that the slope of the top plate 102 allows for precipitation to shed off of the mounting device 100. In one example, the slope of the top plate 102 may be between 5 degrees (°) and 45°. In one example, the top plate 102 may have a diameter sufficient to displace a load greater than 50 pounds over the surface of the structure.

Also depicted in the cross-sectional view of the mounting device 100, the anchor fastener 114 extending through the anchor 112 and the frustrum aperture 110. Further, in relation to both FIG. 2 and FIG. 6, a lip 202 may be coupled to or monolithically formed with the annular flange 104. The lip 202 may serve to seal the mounting device 100 to the structure to which the mounting device 100 is coupled. In one example, the lip 202 may be made of a deformable material that deforms with the surface of the structure to assist in sealing portions of the mounting device 100 from the environment in which the mounting device 100 is deployed including the annular flange 104, the negative space below the top plate 102, the flange fasteners 602 and any holes within the structure created by coupling the flange fasteners 602 to the structure. The environment may include any type of weather including precipitation, wind, contaminating dirt, solar heat, etc. In one example, the lip 202 may serve as a damn against which a sealing material such as, for example, a rubber gasket, a sealant, an adhesive, a waterproof sealant, or similar bonding agent, pitch, tar, or other sealing material a may be deposited. In this manner, the mounting device 100 may be sealed from the environment once installed and any holes formed by the flange fasteners 602 impinging on the surface of the structure may not allow fluids from precipitation, for example, to enter the structure.

Figure 7:
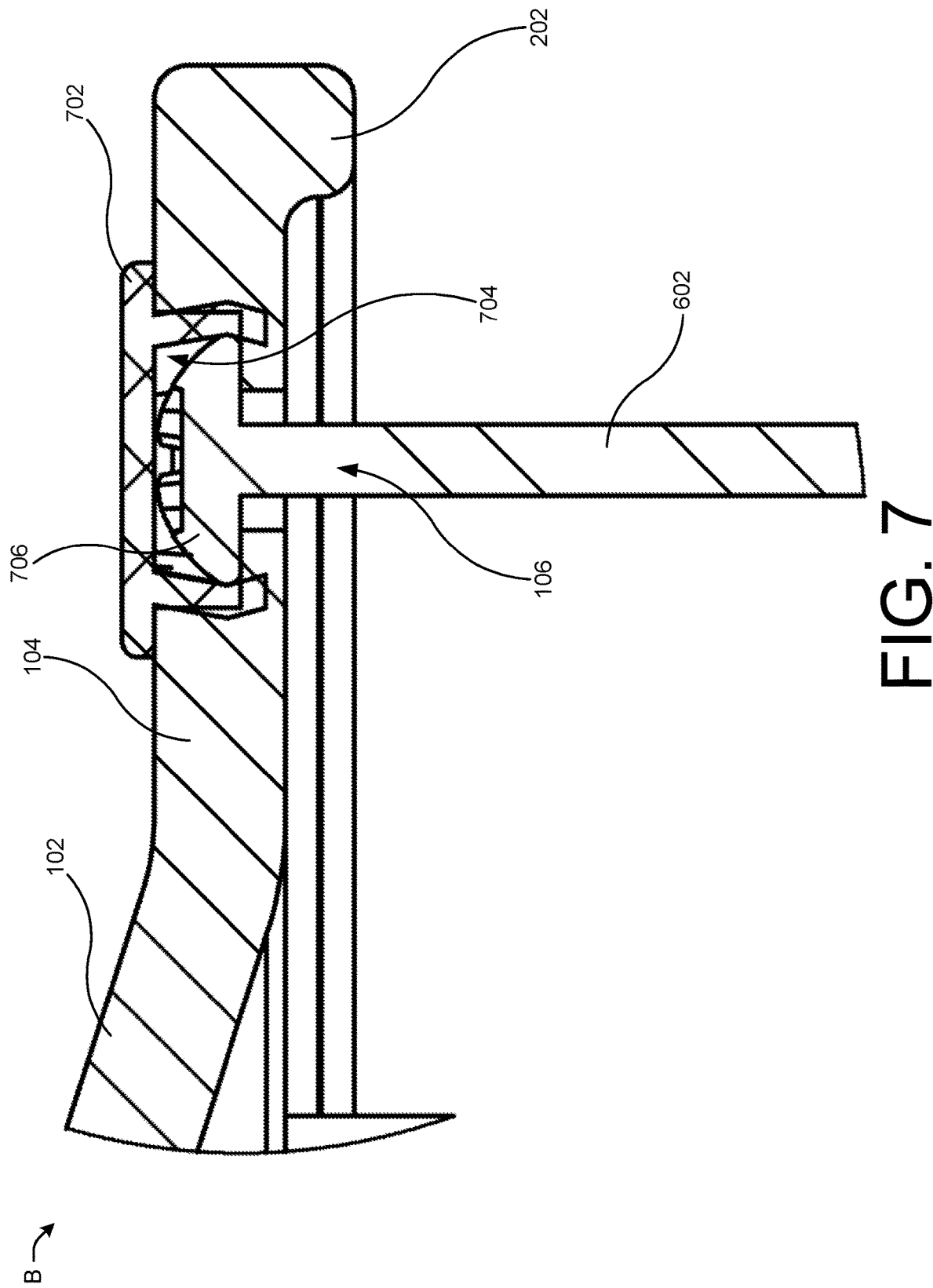
FIG. 7 illustrates a side cross-sectional view of the mounting device of FIG. 1 at circle B depicted in FIG. 6, according to an example of the principles described herein.

FIG. 7 illustrates a side cross-sectional view of the mounting device 100 of FIG. 1 at circle B depicted in FIG. 6, according to an example of the principles described herein. As described herein, a number of flange fasteners 602 may be caused to engaged with respective flange apertures 106 defined in the annular flange 104 in order to secure the mounting device 100 to a structure. The flange fasteners 602 may seat in a fastener recess 704 defined in the flange apertures 106. For example, a head 706 of the flange fasteners 602 may interface with the fastener recess 704 in order to force the lip 202 towards the surface of the structure as the flange fasteners 602 are driven into the structure.

The mounting device 100 may further include a number of fastener caps 702. The fastener caps 702 may be made of a deformable material such that the fastener caps 702 may form an engineering fit with the fastener recess 704. In one example, the fastener caps 702 may engage with respective fastener recesses 704 via an engineering fit such as, for example, a clearance fit (e.g., one of a loose running fit, a free running fit, a close running fit, a sliding fit, and a location fit), a transition fit (e.g., one of a similar fit, and a fixed fit), and an interference fit (e.g., one of a press fit, a driving fit, and a forced fit). The engineering fit may define a clearance between two mating parts (e.g., the fastener caps 702 with respect to the fastener recesses 704), and the size of this clearance determines whether the parts can, at one end of the spectrum, move or rotate independently from each other or, at the other end, are temporarily or permanently joined together. In this manner, the fastener caps 702 may hermetically seal the head 706 of the flange fasteners 602 as well as the fastener recesses 704, the flange apertures 106, the flange fasteners 602, and any holes formed by the flange fasteners 602 impinging on the surface of the structure such that fluids from precipitation, for example, may not impinge these elements and structures. In one example, the fastener caps 702 may be made of a polymer such as a plastic material or a rubber material.

Although

Figure 8:
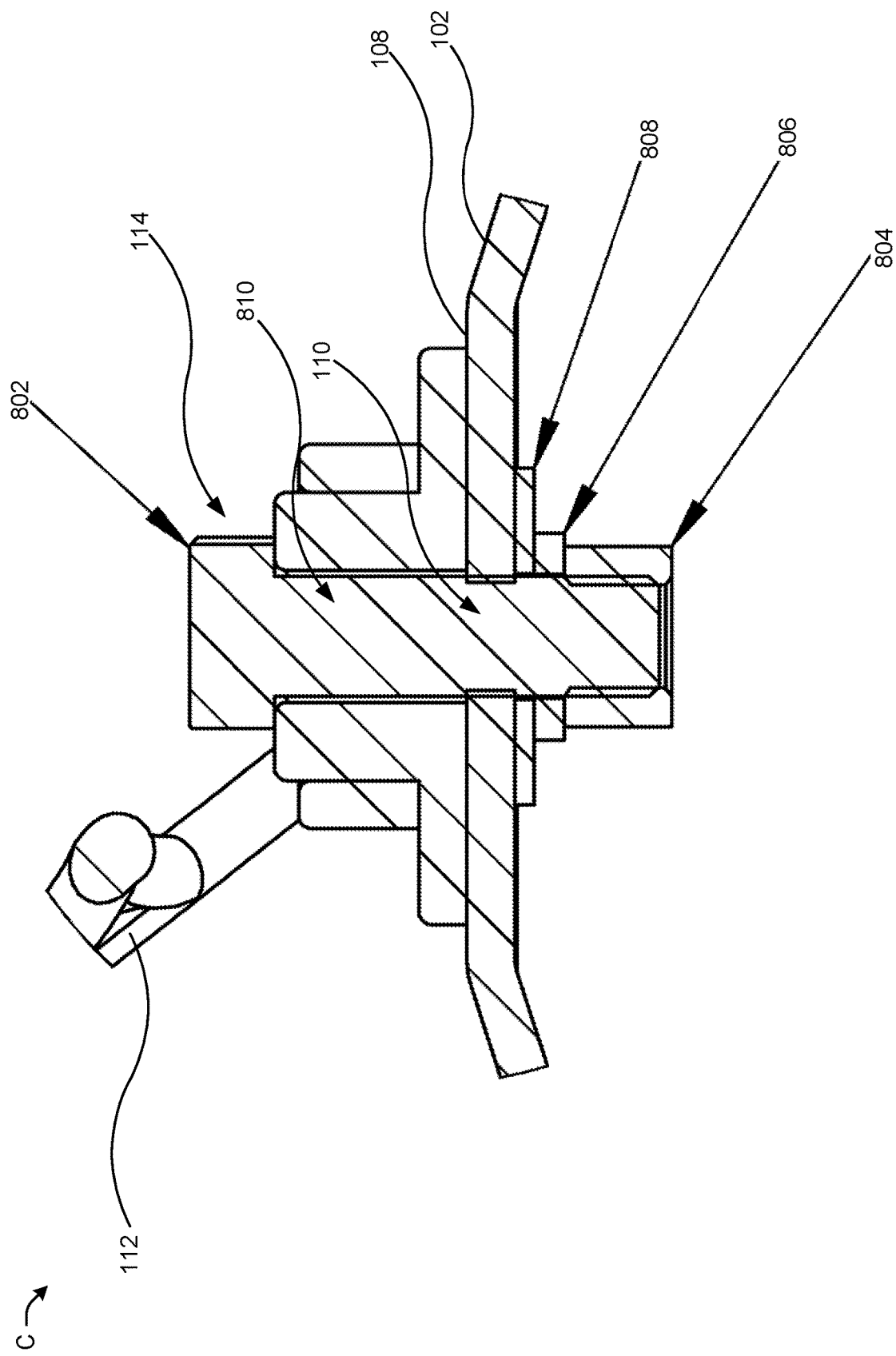
FIG. 8 illustrates a side cross-sectional view of the mounting device of FIG. 1 at circle C depicted in FIG. 6, according to an example of the principles described herein.

FIG. 8 illustrates a side cross-sectional view of the mounting device of FIG. 1 at circle C depicted in FIG. 6, according to an example of the principles described herein. As mentioned above, the anchor 112 may be coupled to the frustrum surface 108 of the mounting device 100. The frustrum surface 108 includes the frustrum aperture 110 defined therein. In FIG. 8, the anchor fastener 114 is depicted as including a bolt 802 (e.g., a threaded bolt) that is extended through an anchor aperture 810 defined in the anchor 112 and is further extended through the frustrum aperture 110 defined in the frustrum surface 108. The anchor fastener 114 also includes a washer 808, a spring or locking washer 806, and a nut 804 that mechanically engages with the bolt 802. In this manner, the anchor 112 may be secured to the mounting device 100.

In one example, waterproofing devices and/or substances may be placed between the frustrum surface 108 of the mounting device 100 and the washer 808. In one example, a number of gaskets may be included between a top side of the frustrum surface 108 and a bottom surface of the anchor 112 and/or a bottom side of the frustrum surface 108 and the washer 808. In one example, the waterproofing devices and/or substances may include a sealant, an adhesive, a waterproof sealant, or similar bonding agent, pitch, tar, or other sealing material.

In one example, the top plate, the annular flange 104, the frustrum surface 108, the lip 202, and any portions thereof may be made of metal, metal alloys, or other rigid materials. Further, the top plate, the annular flange 104, the frustrum surface 108, the lip 202, and any portions thereof may be surface treated to reduce or eliminate any oxidation or other forms of corrosion to occur on the mounting device 100. The surface treatment may include, for example, galvanization, powder coating, painting, other types of surface treatments, and combinations thereof.

CONCLUSION

The examples described herein provide a device, system, and method for securing an individual to a roof surface. The mounting device may be coupled to a roof surface anywhere with or without being coupled to understructures such as joists, etc. while still allowing for a secure device capable of being loaded at a standardized load such as, for example, 5,000 pounds.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative some examples that fall within the scope of the claims of the application.

What is claimed is:

1. A mounting device comprising:
a top plate including:
a cone-shaped center portion;
a flange coupled to or monolithically formed with the cone-shaped center portion;
a number of apertures defined in the flange; and
a number of fasteners engaged with the apertures to couple the top plate to a surface of a structure,
wherein the flange seals a bottom side of the top plate to the surface of the structure,
wherein the flange includes a seal coupled to or monolithically formed with the bottom of the flange,
wherein the seal includes a lip protruding downward from the bottom of the flange.

2. The mounting device of claim 1, wherein the cone-shaped center portion has a convex paraboloid shape.

3. The mounting device of claim 2, wherein the flange includes at least one surface that is parallel to a surface of the structure, and a transition between the cone-shaped center portion and the flange forms an angle.

4. The mounting device of claim 1, further comprising a bolt extending through a first aperture defined in the top plate.

5. The mounting device of claim 4, further comprising an anchor coupled to the bolt.

6. The mounting device of claim 4, wherein:
the cone-shaped center portion has a convex paraboloid shape, and
the bolt is located at a vertex of the convex paraboloid shape.

7. The mounting device of claim 1, wherein the lip is disposed at a perimeter of the flange.

8. The mounting device of claim 1, wherein the lip is disposed radially farther from the cone-shaped center portion than the fasteners.

9. A mounting device comprising:
a top plate including:
a cone-shaped center portion;
a flange coupled to or monolithically formed with the cone-shaped center portion;
a number of apertures defined in the flange; and
a number of fasteners engaged with the apertures to couple the top plate to a surface of a structure,
wherein the apertures define respective fastener recesses in the flange against which a head of the respective fasteners seat, and
a number of fastener caps, wherein the fastener caps are configured to seal the head of the respective fastener from an environment,
wherein the fastener caps include a deformable material such that the fastener caps engage the respective fastener recesses to create a hermetical seal between the fastener cap and the fastener recess.

10. The mounting device of claim 9, wherein the fastener caps are made of a polymer material.

11. A mounting device comprising:
a top plate including:
a cone-shaped center portion;
a flange coupled to or monolithically formed with the cone-shaped center portion;
a number of apertures defined in the flange; and
a number of fasteners engaged with the apertures to couple the top plate to a surface of a structure,
wherein the flange seals a bottom side of the top plate to the surface of the structure,
wherein the flange includes a seal monolithically formed with the bottom of the flange to seal the bottom side of the top plate to the surface of the structure thereby to seal at least a portion of the mounting device from the environment in which the mounting device is deployed.

12. The mounting device of claim 11, wherein said at least the portion includes the flange, a negative space below the top plate, the fasteners, and/or holes within the structure created by coupling the fasteners to the structure.

13. The mounting device of claim 11, wherein the top plate includes a frustum surface coupled to or monolithically formed with the top plate to form a conical frustum shape of the top plate.

14. The mounting device of claim 13, wherein a frustum aperture is defined in the frustum surface, and further comprising a bolt extending through the frustum aperture and an anchor coupled to the bolt.

15. The mounting device of claim 13, wherein the frustum surface and the flange are oriented in a parallel manner with respect to one another such that both the frustum surface and the flange are oriented horizontally.

16. The mounting device of claim 13, wherein the top plate positioned between the frustum surface and the flange is angled with respect to the frustum surface and the flange to allow for precipitation to shed off of the mounting device.

17. The mounting device of claim 16, wherein a slope of the angle of the top plate between the frustum surface and the flange is between 5 degrees and 45 degrees.

18. The mounting device of claim 13, wherein the distance between the frustum surface and the flange is between 2 and 10 inches.

19. The mounting device of claim 13, wherein the distance between the frustum surface and the flange is between 5 and 6 inches.

20. The mounting device of claim 11, wherein the top plate and the flange are made of metal or metal alloys.

21. The mounting device of claim 11, wherein the top plate and the flange are surface treated with a surface treatment including galvanization, powder coating, and/or painting, or combinations thereof.

22. A method of mounting a mounting device to a surface of a structure, comprising: providing a top plate including: a cone-shaped center portion; a flange coupled to or monolithically formed with the cone-shaped center portion; a number of apertures defined in the flange; and a number of fasteners, wherein the flange includes a seal monolithically formed with the bottom of the flange engaging the number of fasteners with the apertures to couple the top plate to the surface of the structure such that the flange seals a bottom side of the top plate to the surface of the structure thereby to seal at least a portion of the mounting device from the environment in which the mounting device is deployed.

* * * * *